O. F. R. BROMBERG.
COMBINED TIRE VALVE AND PRESSURE GAGE.
APPLICATION FILED MAY 10, 1915.
1,156,268.
Patented Oct. 12, 1915.
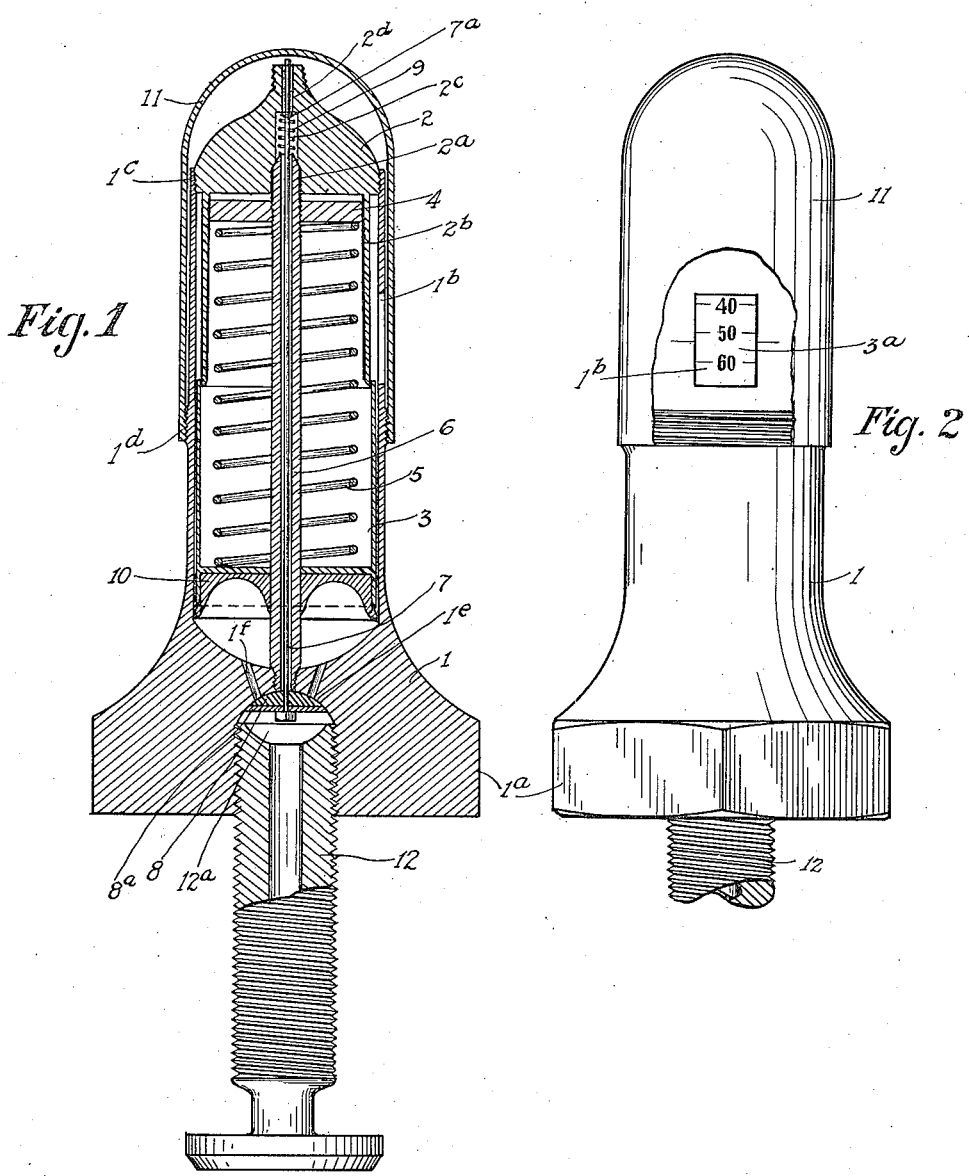
WITNESSES:
INVENTOR.
OSCAR F. R. BROMBERG
BY
ATTORNEY.

UNITED STATES PATENT OFFICE.

OSCAR F. R. BROMBERG, OF SAN DIEGO, CALIFORNIA.

COMBINED TIRE-VALVE AND PRESSURE-GAGE.

1,156,268.　　　　Specification of Letters Patent.　　Patented Oct. 12, 1915.

Application filed May 10, 1915. Serial No. 27,026.

*To all whom it may concern:*

Be it known that I, OSCAR F. R. BROMBERG, a citizen of the United States, residing at San Diego, in the county of San Diego and State of California, have invented certain new and useful Improvements in Combined Tire-Valves and Pressure-Gages, of which the following is a specification.

My invention relates to a combined tire valve and pressure gage for pneumatic tires.

The objects of my invention are: first, to provide a combined tire valve and pressure gage by the use of which it may readily be ascertained the amount of pressure in the tire while it is being filled or at any other time; second, to provide a novel construction of tire valve in combination with a pressure valve; and third, to provide a device of this class which is simple and economical of construction, durable, easily installed and does not readily get out of order.

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification; in which:

Figure 1, is a sectional view of my device and Fig. 2, is a side elevational view thereof showing a portion of the cap broken away to illustrate the scale portion of the pressure gage.

Similar characters of reference refer to similar parts throughout the several views.

The main part 1, end plug 2, plunger 3, adjusting nut 4, pressure gage spring 5, tube 6, valve rod 7, valve 8, valve spring 9, plunger washer 10, cap 11, and stem 12 constitute the principal parts of my device.

The stem 12 is of the ordinary or conventional type excepting the top end which is different from the ordinary by reason of the removal of the pump and cap thread and the recess 12ª. Upon this top end is screwed the main part 1 which is provided with a hexagon portion 1ª to facilitate its tightening upon the stem 12. This main part 1 extends upwardly in cylindrical form and is provided with a hole 1ᵇ in one side thereof. This main part 1 is provided with an internal thread 1ᶜ at its top end and with an external thread 1ᵈ intermediate of the ends thereof. Centrally in the lower end of this main part 1 is screwed the tube 6 which extends upwardly to approximately the same height as the main part 1. Into the upper end of this main part 1 by means of the threads 1ᶜ is screwed the end plug 2 which is provided with external threads adapted to fit the threads 1ᶜ. This plug 2 is provided with a downwardly extended cylindrical portion 2ᵇ. The adjusting nut 4, for adjusting the tension of the spring 5, is provided with an internal thread adapted for the threads on the upper end of the tube 6. This plug 2, is also provided with a recess 2ᶜ adapted for the spring 9 and extending from said recess to the upper surface of the cap is the hole 2ᵈ through which the upper end of the valve rod 7 protrudes. This valve rod is provided with a collar 7ª near its upper end for engagement with the upper end of the spring 9. Secured on the lower end of this valve rod 7 is the valve 8 which engages with a curved valve seat 1ᵉ, the valve 8 being preferably composed of an elastic material covered with a disk 8ª. Extending from this curved valve seat 1ᵉ upwardly are ports 1ᶠ, extending to the inner surface of the main port 1 to allow air to pass from the tire to the inner surface of said main part. Reciprocally mounted in this main part, between its inner surface and the outer surface of the lower extended portion of the plug 2, is the plunger 3 which is adapted to be raised and lowered in said main part 1 by means of the air from the tire through the ports 1ᶠ and against the lower surface of said plunger in accordance with the amount of pressure in said tire and the movement of said plunger is regulated by the pressure of the compression spring 5. This plunger is provided with a washer 10, adapted to press against the inner surface of the main part 1 and the outer surface of the tube 6, to form tight joints. On the outer surface of the plunger 3 is provided a scale 3ª and the pressure in the tire causes the plunger 3 to raise so that the scale 3ª shows in the hole 1ᵇ, so that the amount of pressure in the tire may be readily determined at any time. The valve 8 is open either while pumping air into the tire or by pressure with the thumb on the upper end of the valve rod 7. Over the top end of this main part 1 and plug 2, is the cap 11 which is provided with internal threads in its lower end adapted for the thread 1ᵈ on the main part, 1.

Though I have shown and described a particular construction, combination and arrangement of parts I do not wish to be limited to this particular construction, combination and arrangement but desire to include in the purview of my invention, the construction, combination and arrangement substantially as set forth in the appended claims.

It is obvious that with this construction there is provided a combined tire valve and pressure gage by the use of which the pressure in the tire may be readily ascertained while the air is being pumped into the tire or by pressure of the thumb on the end of the valve rod 7; that the device is simple and economical of construction, durable and easily installed; that upon pressing the pump tube on the attachment valve rod 7 the valve 8 will open and allow the air to pass from the pump down through the tube 6 into the tire and the pressure in the tire will cause the air to pass through the ports 1ᶠ, operating the pressure gage plungers 3 in accordance with the pressure in the tire.

Having thus described my invention what I claim as new and desire to secure by Letters Patent, is:

1. In a device of the class described, the combination of a tire valve stem, a cylindrical piece secured thereon provided with a curved valve seat with ports leading directly therefrom to the inner surface of said cylindrical piece, a valve mounted in said curved seat, an air conducting tube secured in said cylindrical piece, a valve stem mounted in said tube extending through the outer surface of said cylindrical piece, means for holding said valve seated, a plunger reciprocally mounted in said cylindrical piece, a pressure indicating means in connection therewith and a spring for regulating the movement of said plunger.

2. In a device of the class described, the combination of a tire valve stem, a cylindrical piece secured thereon provided with a valve seat near the lower end thereof adjacent the upper end of said valve stem with ports leading therefrom to the inner surface of said cylindrical piece, a valve mounted in said seat, a tube secured centrally in said cylindrical piece, means for closing the upper end of said cylindrical piece, a valve stem mounted in said tube and said closing means extending through the upper end thereof for operating said valve, a spring for holding said valve seated, a plunger reciprocally mounted in said cylindrical piece, a pressure indicating means in connection therewith and a spring for regulating the movement of said plunger.

3. In a device of the class described, the combination of a tire valve stem, a cylindrical piece secured thereon provided with a valve seat with ports leading therefrom to the inner surface of said cylindrical piece, a valve mounted in said valve seat, a tube secured centrally in said cylindrical piece, a plug secured in the upper end of said cylindrical piece, a valve stem mounted in said tube and said plug, extending through the upper end of said plug for operating said valve, a spring for holding said valve seated, a plunger reciprocally mounted in said cylindrical piece provided with an annular upwardly extended flange, pressure indicating means in connection therewith and adjustable means for regulating the movement of said plunger.

4. In a device of the class described, the combination of a tire valve stem, a cylindrical piece secured thereon provided with a valve seat in the lower end thereof, adjacent the upper end of said valve stem with ports leading therefrom to the inner surface of said cylindrical piece, a valve mounted in said valve seat, a tube secured centrally in said cylindrical piece, means for closing the upper end of said cylindrical piece, a valve stem mounted in said tube and said closing means extending through the upper end of said closing means for operating said valve, a spring for holding said valve seated, a plunger reciprocally mounted in said cylindrical piece, pressure indicating means in connection therewith and adjustable means for regulating the movement of said plunger.

5. In a device of the class described, the combination of a tire valve stem, a cylindrical piece secured thereon provided with a curved valve seat forming a pocket between the upper end of said valve stem and said valve seat with ports leading therefrom to the inner surface of said cylindrical piece, a valve mounted in said pocket, a tube secured centrally in said cylindrical piece, a plug secured to the upper end of said cylindrical piece and fitting on said tube, a plunger reciprocally mounted in said cylindrical piece provided with an upwardly extended annular flange, a pressure indicating means in connection therewith, a compression spring adjustably mounted around said tube adapted to regulate the movement of said plunger and a means for operating said valve through said tube and extending out through the upper end of said plug.

6. In a device of the class described, the combination of a tire valve stem, a cylindrical piece secured thereon, a curved valve seat in connection therewith with ports leading directly therefrom to the inner surface of said cylindrical piece, a valve mounted in said curved seat, an air conducting tube secured in said cylindrical piece, a valve stem mounted in said tube extending through the outer surface of said cylindrical piece, means for holding said valve seated, a plunger reciprocally mounted in said cylindrical piece, a pressure indicating means in connection therewith and a spring for regulating the movement of said plunger.

In testimony whereof, I have hereunto set my hand at San Diego, California, this 3rd day of May, 1915.

OSCAR F. R. BROMBERG.

Witness:
 GLENN H. WHEELER.